J. R. VANDER PUTTEN.

SUCTION CARPET SWEEPER.

APPLICATION FILED SEPT. 2, 1920.

Reissued Oct. 26, 1920.

14,971.

3 SHEETS—SHEET 1.

Inventor

John R. Vander Putten

By Frase, Mitchell, Sayrell and Bond

Attorneys

J. R. VANDER PUTTEN.

SUCTION CARPET SWEEPER.

APPLICATION FILED SEPT. 2, 1920.

Reissued Oct. 26, 1920.

14,971.

3 SHEETS—SHEET 2.

Inventor

John R. Vander Putten

By Frease, Merkel, Sayrell & Bond

Attorney

J. R. VANDER PUTTEN.

SUCTION CARPET SWEEPER.

APPLICATION FILED SEPT. 2, 1920.

Reissued Oct. 26, 1920. 14,971.

3 SHEETS—SHEET 3.

Inventor

John R. Vander Putten

By Frease, Merkel, Sayrell & Bond.

Attorney

UNITED STATES PATENT OFFICE.

JOHN R. VANDER PUTTEN, OF AKRON, OHIO, ASSIGNOR TO THE WISE-McCLUNG MANUFACTURING COMPANY, OF NEW PHILADELPHIA, OHIO, A CORPORATION OF OHIO.

SUCTION CARPET-SWEEPER.

14,971. Specification of Reissued Letters Patent. Reissued Oct. 26, 1920.

Original No. 1,204,718, dated November 14, 1916, Serial No. 120,594, filed September 18, 1916. Application for reissue filed September 2, 1920. Serial No. 407,805.

*To all whom it may concern:*

Be it known that I, JOHN R. VANDER PUTTEN, a citizen of the United States, and a resident of Akron, in the county of Summit and State of Ohio, have invented new and useful Improvements in Suction Carpet-Sweepers, of which the following is a specification.

This invention relates to improvements in devices for brushing and pneumatically cleaning floors and floor coverings such as carpets, rugs and the like and comprises a device provided with an elongated mouth divided by cross bars into a plurality of openings adapted to be located in juxtaposition to the surface to be cleaned, one of said openings being unobstructed and so shaped that a strong inrush of air into the device takes place through said openings, the remaining openings being provided with rotatable brushes for removing fine dirt and dust.

The object of the present invention is to generally improve portable suction sweepers and to combine in a device of the character mentioned a motor driven suction creating device so constructed as to produce an extremely strong inrush of air through the central portion of the device with a mechanically operated brushing device preferably operated by contact with the surface to be cleaned.

A further object is to provide a sweeper of the character mentioned with an elongated mouth comprising a series of rectangular openings arranged to be located adjacent the surface to be cleaned, these openings being formed by bars of less height than the casing thus forming communication between all of the compartments and the suction creating device, the central openings being unobstructed, leaving a passage directly through the casing to the suction creating device, the end openings being provided with brushing devices, thus allowing for the inrush of air through the central opening to pull the air from each of the end openings.

A still further object is to provide a sweeper of this character with a series of mouth openings arranged to be located adjacent the surface to be cleaned, the central opening being unobstructed and having the lower portion of the front wall removed in order to create an unusually strong inrush of air through said opening to the suction creating device, thus permitting the central opening of the mouth to pick up large particles of rags, paper, string and the like while the end openings are provided with brushing devices adapted to remove threads, lint and finer particles of dust and dirt communication being provided at the upper portions of the end and central openings, allowing the air to be pulled from the end compartments.

A further object is to provide a machine of the character referred to with an aperture in the casing for receiving the usual flexible hose to which attachments are connected for cleaning draperies, upholstering and the like, a sliding plate being provided for normally covering said apertures, said plate serving also as a name plate, thus giving the device a finished and pleasing appearance.

A further object is to provide a sweeper of the character referred to in which the lower portion of the sweeper casing, which comes into contact with the floor covering is composed of a non-discoloring or non-colorable alloy.

In the drawings.

Similar numerals of reference indicate corresponding parts throughout the several figures of the drawing.

Figure 1:
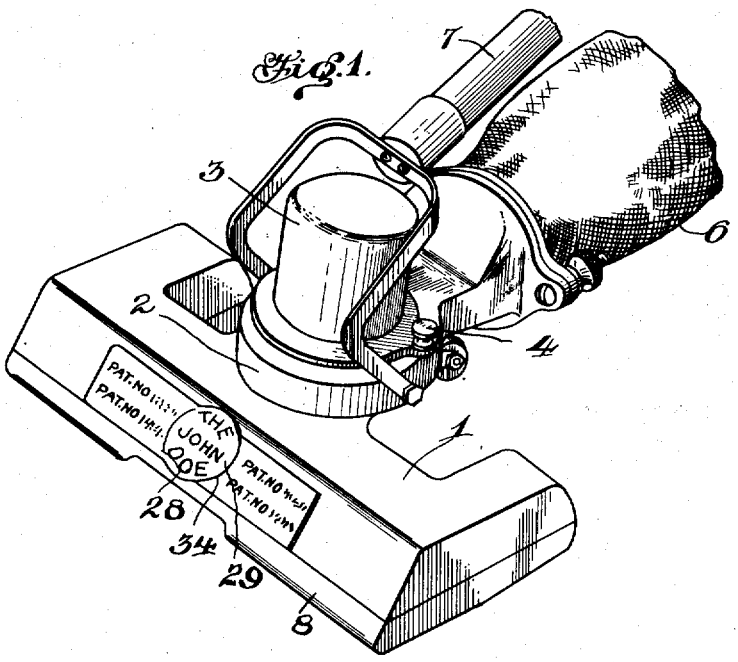
Figure 1 is a perspective view of a sweeper constructed in accordance with my invention.
Figure 2:
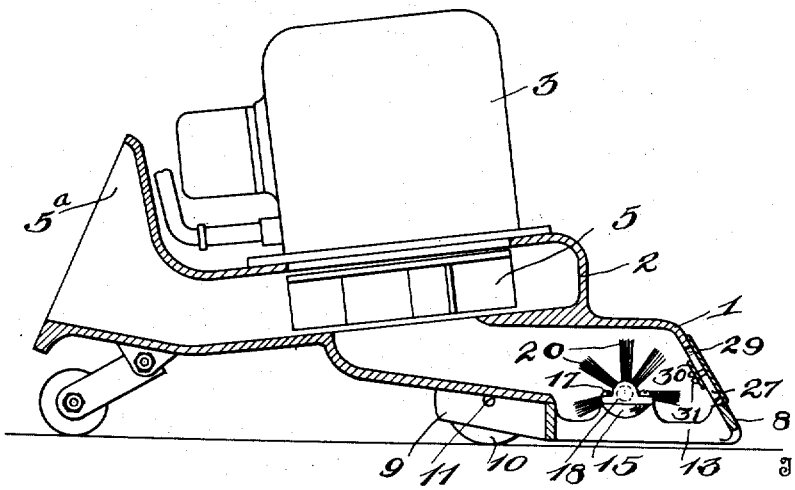
Fig. 2 is a vertical transverse section through the same.
Figure 3:
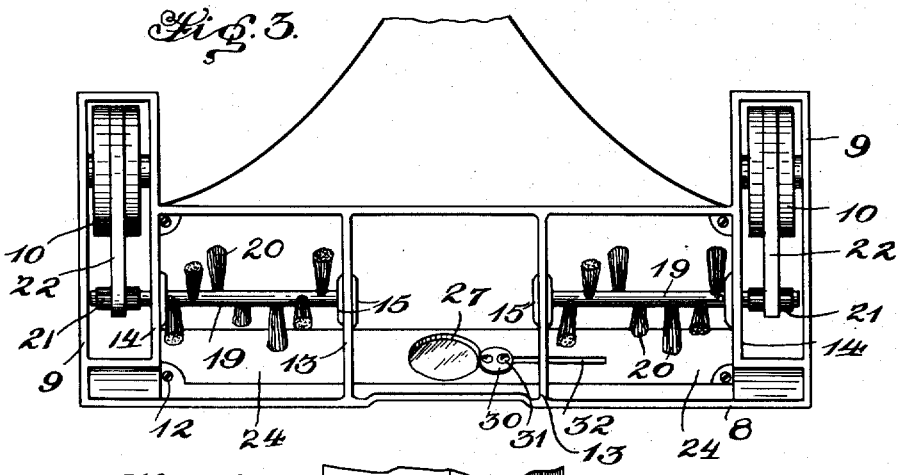
Fig. 3 is a bottom plan view of the sweeper.
Figure 4:
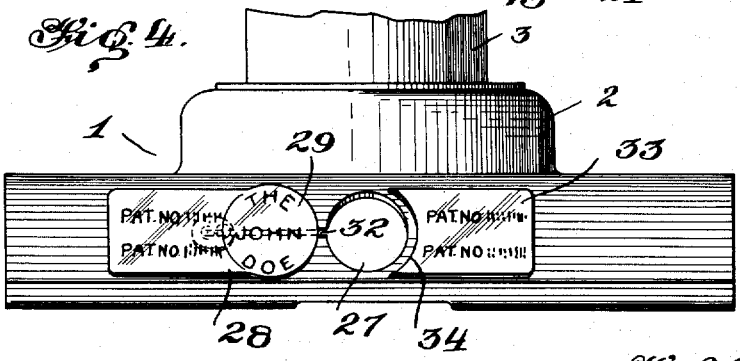
Fig. 4 is a front elevation.
Figure 5:
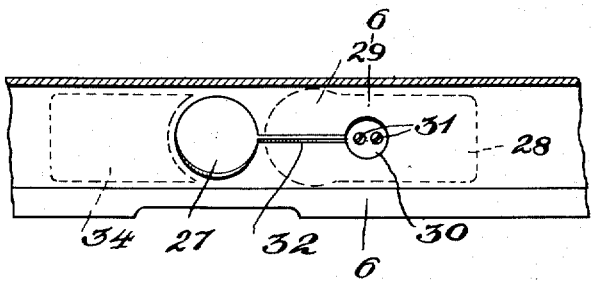
Fig. 5 is a fragmentary interior view of the front wall, showing the means of attaching the name plate.
Figure 6:
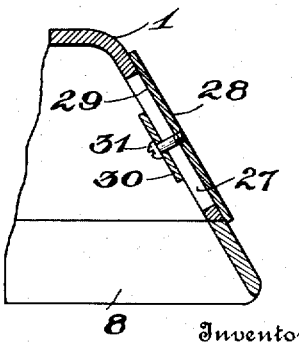
Fig. 6 is a section on the line 6—6, Fig. 5.
Figure 8:
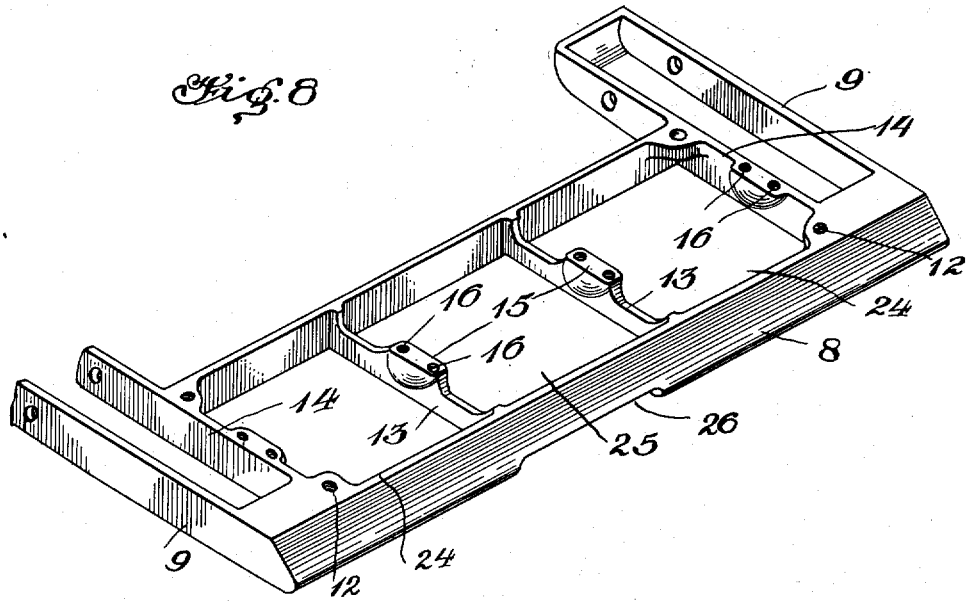
Fig. 8 is a similar view showing the brushes and wheels removed.
Figure 7:
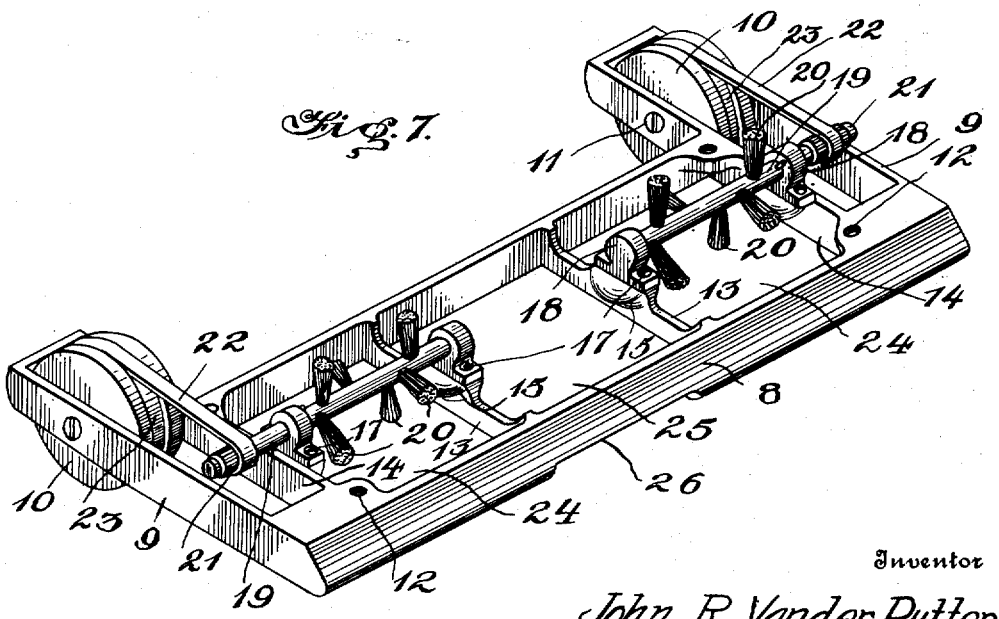
Fig. 7 is a perspective view of the detachable lower portion of the casing, showing the brushes and wheels assembled therein.

In the present form of suction sweepers which are in actual use an elongated and relatively narrow slot is provided in the under wall of the casing and arranged to be held in contact with the surface to be cleaned. With this construction of sweeper, although removing dust and dirt and smaller particles of such litter and rubbish as usually accumulates upon the floors of residences, stores or office rooms, larger portions of rags, lint, thread, etc., such as ordinarily accumulates in a sewing room cannot be so readily removed with the use of the narrow slot type of sweeper and it is my purpose primarily to produce a sweeper which will not only remove the dust and finer particles of dirt, but which will easily and readily pick up larger pieces of rags, paper and the like. The present machine is a self-contained, portable device, comprising a casing having a suction creating device therein, the lower portion of the casing forming a wide elongated mouth which contacts with the floor being divided into rectangular openings communicating with the suction creating device, the central opening being unobstructed and having its front wall terminating at a considerable distance from the floor, the end openings being provided with rotary brushes preferably operated by the driving wheels upon which the casing is mounted, an aperture being formed in the forward face of the casing for the purpose of attaching the usual hose, which carries attachments for cleaning upholstery, portières, drapery and the like, a name plate being slidably mounted upon the casing for the purpose of normally covering said aperture, the entire lower portion of the casing which carries the three compartments above referred to being preferably formed separate from the remainder of the casings and composed of a non-discoloring alloy.

Referring more especially to the construction illustrated in the accompanying drawings, the numeral 1 indicates the casing of the sweeper, the numeral 2 the fan casing which is preferably formed integral therewith and the numeral 3 the electric motor, which may be of any well known design and is mounted upon the fan casing by means of screws 4 or their equivalents. Within the fan casing 2 is a fan 5 operatively connected to the motor 3, said motor and fan being adapted to exhaust the air from the casing 1 through the exhaust collar $5^a$, which is preferably formed integral with the casing in the usual manner.

To the exhaust collar $5^a$ is connected a dust receptacle 6 shown in the drawings as consisting of a cloth bag supported from the handle and adapted to receive through the collar $5^a$ dust and sweepings as they are expelled from the casing 1.

To the fan casing 2 is pivotally connected the handle 7, said handle being of the usual form and adapted to be grasped by the operator for the purpose of moving the sweeper over the floor or other surface to be cleaned.

The lower portion of the casing is preferably formed separate from the body portion of the casing and comprises a frame 8 of oblong form having the openings 9 at the ends thereof for the purpose of receiving the drive wheels 10, said wheels being pivoted within said openings as shown at 11. The frame 8 is provided with screw threaded apertures 12 for the purpose of attaching the same to the body portion 1 of the casing.

Spaced bars 13 divide the mouth of the frame 8 into a plurality of rectangular openings of equal size, each of said openings being preferably square. The bars 13 and the end walls 14 are each provided with an enlarged or thickened portion 15 having screw threaded apertures 16 therein for the purpose of receiving screws 17 to attach the bearings 18, the shafts 19 of the brushes 20 being journaled within said bearings. Corrugated rollers 21 are provided upon the outer extremities of the shafts 19 driving belts 22 being located over said rollers and in the grooves 23 of the drive wheels 10, thus causing the brushes 20 to be rotated with the movement of the machine.

It will be noted that the brushes 20 are located wholly within the end openings 24 while the central opening 25 is unobstructed, leaving a direct passage for the inrush of air through the cutaway portion 26 in the front wall thereof, and thence through said opening 25 and the casing 1 to the fan; and it is evident that the bars serve to bridge the wide mouth of the machine and prevent rugs, carpets and other flexible fabrics from being drawn into the same.

As it is usual to provide, with sweepers of this construction, a hose adapted to be detachably secured to the casing, said hose being provided with attachments or nozzles for cleaning upholstery portières and similar articles, an aperture 27 is provided in the front wall of the casing 1 for the purpose of attaching said hose.

The aperture 27 is adapted to be normally closed by the sliding plate 28, said plate having a disk portion 29 arranged to be located over the aperture. A disk 30 is located against the inner face of the outer wall of the casing, said disk being connected to the plate 28 by means of suitable screws or pins 31, which are located through the horizontally disposed slot 32, formed at the front wall thus slidably mounting the plate 28 upon the front wall of the casing.

A plate 33 is fixedly mounted upon the front face of the casing, adjacent the aperture 29 and is provided with the concaved end 34 adapted to receive the disk portion 29 of the sliding plate 28. The sliding plate 28 not only serves as a cover plate for the aperture 29 when the attachments are not in use, but in combination with the plate 33 forms a name plate upon which the name of the machine and patent numbers or other information regarding the machine may be placed.

From the above description it will be seen that my sweeper comprises a casing having a motor operated fan located therein, with a mouth divided into a plurality of rectangular openings formed in the lower portion of said casing, all of said openings communicating with the cavity fan casing, brushes mounted in the openings and adapted to be rotated by the movement of the sweeper upon the surface to be cleaned, the central opening being unobstructed and having the lower portion of its front wall cut away, allowing for an extremely strong inrush of air through said opening to the suction creating device, whereby large pieces of cloth, paper, string and the like may be taken up through said central opening, while part of the lower edge of the casing is adapted to be substantially in contact with the surface to be cleaned, thus allowing a smaller amount of air to be taken up through the end openings, the rotating brushes therein disturbing the dust and fine dirt upon the surface over which the sweeper is moved, the strong current of the air passing through the central opening pulling the air from the end opening, thus taking up the fine dirt and dust which is disturbed by the rotary brushes. The sweeper is also provided with the aperture for attaching the hose for special cleaning attachments and nozzles, a combined name plate and cover plate for said aperture being slidably mounted upon the sweeper casing, thus giving the device a finished and pleasing appearance.

I claim:—

1. In a suction carpet sweeper of the character described, a hollow casing arranged to be moved upon a floor, the lower extremity of said casing forming a wide elongated mouth arranged to be located in juxtaposition to the floor, a suction creating device located within said casing, driving wheels rotatably mounted upon said casing, a plurality of bars dividing the mouth of said casing into a plurality of openings, rotary brushes mounted in the end openings, and means operatively connecting said driving wheels and said brushes, the central opening being unobstructed.

2. In a suction carpet sweeper of the character described, a hollow casing arranged to be moved upon a floor, the lower extremity of said casing forming a wide elongated mouth arranged to be located in juxtaposition to the floor, driving wheels rotatably mounted upon said casing, a plurality of bars dividing the mouth of said casing into a plurality of openings, rotary brushes mounted in the end openings, means operatively connecting said driving wheels and said brushes, the central opening being unobstructed, and a cut away portion in the lower forward edge of the front wall of said central opening.

3. In a suction carpet sweeper of the character described, a hollow casing, a suction creating device located within said casing, an oblong frame detachably connected to the under open side of said casing, driving wheels rotatably mounted within said frame, transversely disposed bars dividing said frame into a plurality of rectangular openings, rotary brushes mounted in the end openings and means operatively connecting said driving wheels and said brushes, the central opening being unobstructed.

4. In a suction carpet sweeper of the character described, a hollow casing, a suction creating device located within said casing, an oblong frame detachably connected to the under open side of said casing, driving wheels rotatably mounted within said frame, transversely disposed bars dividing said frame into a plurality of rectangular openings, and a cut away portion in the lower forward edge of the front wall of the central opening.

5. In a suction carpet sweeper of the character described, a hollow casing, a suction creating device located within said casing, an oblong frame detachably connected to the under open side of said casing, driving wheels rotatably mounted within said frame, transversely disposed bars dividing said frame into a plurality of rectangular openings, and a cut away portion in the lower forward edge of the front wall of said central opening, bearings mounted upon said bars, rotary brushes journaled in said bearings and located within the end openings, and means operatively connecting said driving wheels and said brushes, the central opening being unobstructed.

6. In a suction carpet sweeper of the character described, a hollow casing, a suction creating device located within said casing, an oblong frame detachably connected to the under open side of said casing, driving wheels rotatably mounted within said frame, transversely disposed bars dividing said frame into a plurality of rectangular openings, and a cut away portion in the lower forward edge of the front wall of said central opening, bearings mounted upon said bars, rotary brushes journaled in said bearings and located within the end openings, means operatively connecting said driving wheels and said brushes, the central opening being unobstructed, and a cut away portion in the lower forward edge of the front wall of said central opening.

JOHN R. VANDER PUTTEN.